(12) United States Patent
Liao et al.

(10) Patent No.: US 6,423,666 B1
(45) Date of Patent: Jul. 23, 2002

(54) LARGE-PORE CHROMATOGRAPHIC BEADS PREPARED BY SUSPENSION POLYMERIZATION

(75) Inventors: Jia-Li Liao, San Pablo, CA (US); Stellan Hjerten, Uppsala (SE)

(73) Assignee: Bio-Rad Laboratories, Inc., Hercules, CA (US)

( * ) Notice: Subject to any disclaimer, the term of this patent is extended or adjusted under 35 U.S.C. 154(b) by 0 days.

(21) Appl. No.: 09/412,729

(22) Filed: Oct. 5, 1999

(51) Int. Cl.⁷ .............................................. B01D 15/08
(52) U.S. Cl. .................................... 502/402; 210/198.2
(58) Field of Search .................................. 210/635, 656, 210/198.2, 502.1; 502/402

(56) References Cited

U.S. PATENT DOCUMENTS

| | | | |
|---|---|---|---|
| 4,184,020 A | 1/1980 | Lim et al. | 521/52 |
| 4,935,465 A | 6/1990 | Nilsson et al. | 435/178 |
| 5,583,162 A | 12/1996 | Li et al. | 521/56 |
| 5,645,717 A | 7/1997 | Hjerten et al. | 210/198.2 |
| 5,647,979 A | 7/1997 | Liao et al. | 210/198.2 |
| 5,935,429 A | 8/1999 | Lia et al. | 210/198.2 |

FOREIGN PATENT DOCUMENTS

| | | |
|---|---|---|
| EP | 0 852334 A1 | 7/1998 |
| EP | 0 852 334 A1 | 7/1998 |
| WO | WO 95/26988 | 10/1995 |
| WO | WO 98 30598 | 7/1998 |

*Primary Examiner*—Stuart L. Hendrickson
(74) *Attorney, Agent, or Firm*—Townsend and Townsend and Crew LLP

(57) ABSTRACT

Chromatographic beads with pores large enough to serve as through-channels for fast diffusion and a substantial absence of pores of smaller diameters that would cause band broadening due to slow diffusive transport, are formed by suspension polymerization of an aqueous solution of a monomer mixture that includes a total monomer (combination of polymer backbone monomer and crosslinking agent) concentration of 2% to 50% by weight relative to the aqueous solution and a crosslinking agent in an amount such that the mole ratio of crosslinking agent to total monomer is from about 0.1 to about 0.7. The suspension polymerization process involves forming a suspension of aqueous droplets of the monomer mixture in an organic phase.

27 Claims, 7 Drawing Sheets

LARGE-PORE CHROMATOGRAPHIC BEADS PREPARED BY SUSPENSION POLYMERIZATION

This invention relates to chromatographic separation media and to suspension polymerization.

BACKGROUND OF THE INVENTION

Chromatographic separation media in the form of continuous polymeric beds with pores large enough for hydrodynamic flow are disclosed in U.S. Pat. No. 5,645,717 (Hjertén et al., issued Jul. 8, 1997) and U.S. Pat. No. 5,647,979 (Liao et al., issued Jul. 15, 1997) and European Patent Application No. EP 0 852 334 A1 (Bio-Rad Laboratories, Inc., published Jul. 8, 1998). These beds are termed "continuous" since each bed is a monolithic solid core occupying the lumen of a column or capillary, spanning the entire cross section of the column or capillary. The core is porous, with pores approximately 3–5 micron in diameter, and therefore larger than those of media conventionally known as macroporous media, whose pores are approximately 0.1 micron in diameter. The bed is formed in place inside the column or capillary, and the pores extend through the bed to serve as channels large enough to permit hydrodynamic flow or fast diffusion through the pores themselves. The bed contains substantially no pores of the "macroporous" size. Due to the presence of large pores and the absence of macropores, most if not all of the solute movement through the bed occurs as hydrodynamic flow or rapid diffusion, with essentially none of the slow diffusive transport that typically occurs through the smaller pores of macroporous media. This avoidance of slow diffusive transport reduces band broadening, while the high surface area of the large through-pores provides high resolution and separation capacity. The large size of the through-pores also permits a high throughput rate through the column.

SUMMARY OF THE INVENTION

The large-pore media described in the two U.S. patents and the European application referenced above are formed in the columns or capillaries themselves as monolithic structures. It has now been discovered that the beneficial qualities of these media can also be achieved in chromatographic beads, thereby combining the advantages of the large pores with the versatility of beads. Beads afford the user the ability to pack the separation column or capillary at the site of use and the ability of the user to select the geometry, size, and bead diameter, each serving as a further variable in determining the degree of and resolution in the chromatographic separation and in determining the flow rates through the column. Thus, in accordance with this invention, chromatographic beads are prepared by suspension polymerization with the same pore characteristics as the large-pore media of the two United States patents and the European patent application referenced above. The beads thus contain through-pores with diameters of approximately 0.5 micron or greater in diameter, preferably about 0.5 micron to about 2.0 microns, with substantially no pores of the macroporous size or smaller, i.e., substantially no pores as small as 0.1 micron in diameter or less.

This invention extends to beads that differ widely in chemical composition and function as separation media. Further descriptions of the qualities of these beads, the manner in which they are prepared, and their methods of use are described in the succeeding sections of this specification.

DETAILED DESCRIPTION OF THE INVENTION AND SPECIFIC EMBODIMENTS

Figure 1:
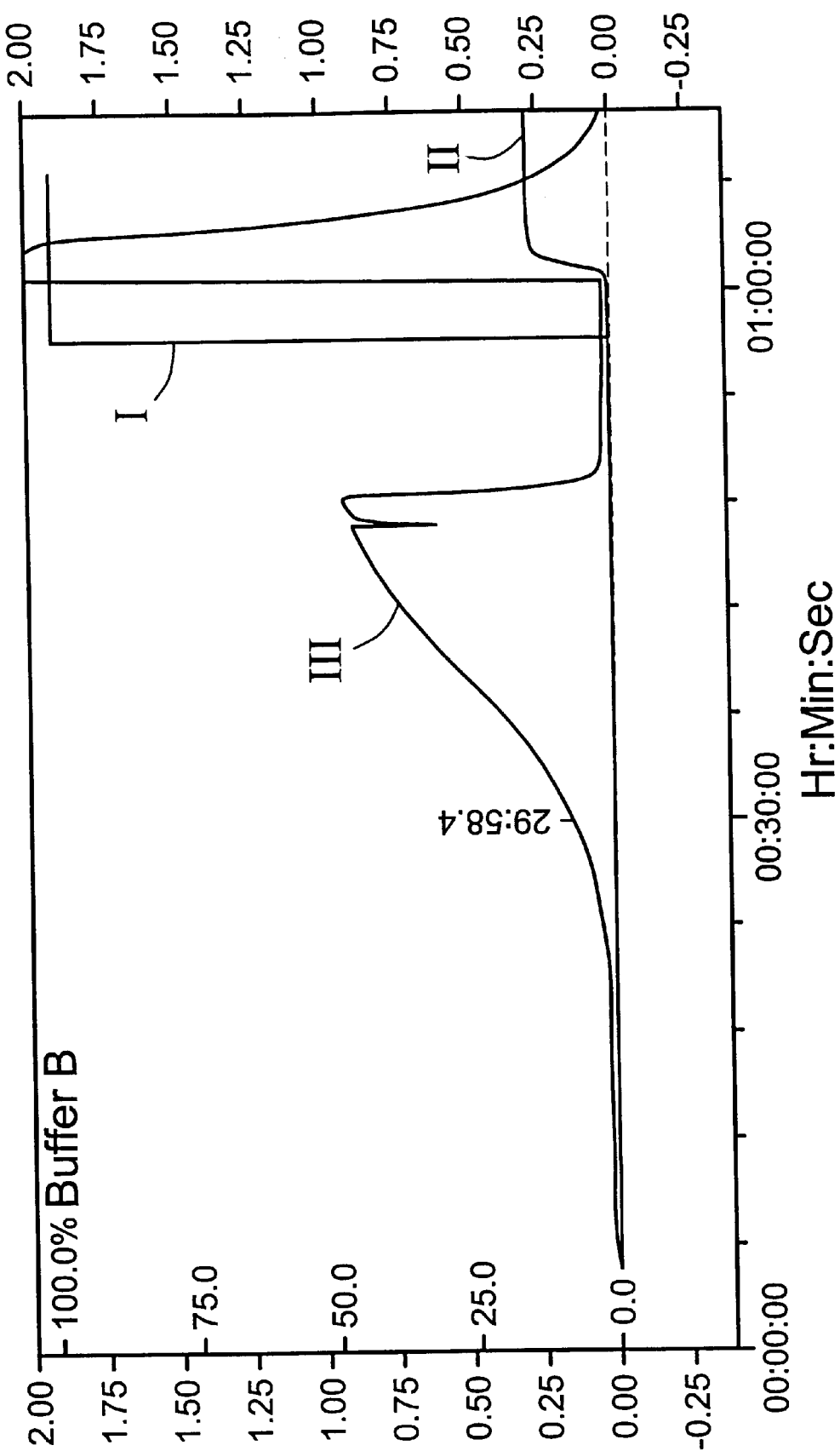
FIG. 1 is a plot of a protein capture study of anion exchange beads prepared in accordance with this invention.

The beads of this invention are solid and insoluble in water as well as in many organic solvents. The beads thus remain solid during their use as chromatographic separation media and serve as packing materials for packed chromatographic columns. The beads are thus used in the same manner as other solid particulate packings for chromatography columns. The beads are formed from a liquid suspension that includes an organic phase and an aqueous phase, the organic phase serving as the continuous phase and the aqueous phase dispersed in the organic phase (a water-in-oil suspension) and containing the polymerizable materials (i.e., the monomer mixture) that form the beads. The beads themselves are thus formed from an aqueous solution, and their pores immediately upon formation of the beads are filled with aqueous liquid. As in the continuous bed prior art, this avoids the need for removing an organic solvent from the pores of the beads; the beads are ready for use in an aqueous separation system without tedious cleaning to remove nonaqueous liquids.

The monomer mixture contains a water-soluble polymerizable compound and a water-soluble crosslinking agent. Preferably, these components are sufficiently soluble that aqueous solutions can be formed that contain about 10% or more by weight of these components. The polymerizable compound is generally a monofunctional monomer that polymerizes to form the polymeric matrix of the beads. This compound may be derivatized, as described below, to contain functional groups suitable for any type of separation, including anion exchange, cation exchange, hydrophobic-interaction chromatography, reversed-phase chromatography, bioaffinity chromatography, and dye-ligand bioaffinity chromatography.

The large-pore character of the beads is achieved by using an aqueous phase in which the monomer mixture comprises from about 2% to about 50% by weight of the aqueous phase, preferably from about 20% to about 40% by weight, and a crosslinking agent that is present in a mole fraction of from about 0.1 to about 0.7, and preferably from about 0.3 to about 0.4, relative to the monomer mixture.

A preferred group of polymerizable compounds for use in forming the chains of the polymer are vinyl, allyl, acrylic and methacrylic compounds. Examples of compounds within this group are vinyl acetate, vinyl propylamine, acrylic acid, methacrylate, butyl acrylate, acrylamide, and methacrylamide. If it is desired to form polymers that are derivatized by the inclusion of functional groups, the polymerizable compounds can be substituted derivatives of these examples. Illustrative of these substituted derivatives are compounds substituted with reactive hydroxy groups, epoxy groups, carboxylic acid groups, amino groups, or combinations of these groups. The distribution and density of functional groups can be selected and varied by using combinations of derivatized and non-derivatized compounds in selected ratios.

For ion exchange media, the functional groups will be charged groups covalently attached to the monomers, and a convenient means of forming a polymer with a particular charge density is to use a mixture of charged and uncharged monomers in a specified proportion. In most cases, the proportion of charged monomers to uncharged monomers in such a mixture will be relatively small. The functional groups imparting the charge to the monomers may be any conventional groups used in ion exchange media. For anion exchange media, examples of appropriate functional groups are quaternary ammonium groups with two, three or four alkyl substitutions on the nitrogen atom, the alkyl groups being primarily methyl or ethyl. One example of a monomer bearing a quaternary ammonium group is dimethyl diallyl ammonium chloride. In some cases, the alkyl groups may themselves be substituted, for example with hydroxyl groups. Other examples of quaternary ammonium groups and other classes of positively charged groups for anion exchange will be readily apparent to those skilled in the art. For cation exchange media, examples of appropriate functional groups are sulfonic acid groups, sulfate groups, and carboxylic acid groups. One example of a monomer bearing a sulfonic acid group is allyloxy hydroxypropanesulfonic acid. Another example is hydroxypropyl methacrylate substituted by reaction with vinyl sulfonic acid. In both anion exchange and cation exchange media, the strength of the ion exchanger is determined by the choice of functional groups or the use of combinations of functional groups, while the capacity of the ion exchanger is determined by the density of the functional groups, i. e., the number of groups per volume or weight of the bead.

For hydrophobic interaction chromatographic media, the monomer mixture will include a water-soluble monomer that contains one or more hydrophobic alkyl or phenyl groups. A preferred group of such monomers are hydrophobic alkyl methacrylates and hydrophobic alkyl acrylamides. Preferred alkyl groups for these monomers are those having 3 or 4 carbon atoms, and among these the more preferred are saturated alkyls with the carbon atoms arranged in a linear chain. Examples that are particularly useful for hydrophobic interaction chromatography are n-propyl acrylamide and isopropyl acrylamide.

Functional groups can be incorporated into the structure of the polymer by copolymerization of functionalized monomers with monomers that are not functionalized. Alternatively, the surfaces of the beads and the interior of the pores can be chemically modified after polymerization is completed. This can be achieved by covalent attachment of functional groups through conventional linkages at the polymer surface, using active groups on the monomers forming the polymer structure or on secondary monomers incorporated into the structure. A further alternative is to coat the polymer surface with hydrophilic species by covalent attachment to reduce nonspecific interactions, then to derivatize or to functionalize the polymer coating to achieve a specific type of interaction. Applying a coating to the polymer surface can also serve as a means of providing additional coupling sites for derivatization.

In a further variation on the invention, the properties of the beads can be modified by the addition of hydrophilic polymers to the monomer mixture prior to polymerization. The hydrophilic polymers will be ones that contain polymerizable groups such as allyl groups that will take part in the polymerization reaction. The polymers impart a hydrophilic character to the bead surface, reducing the hydrophobic character and thereby reducing non-specific protein interactions that might occur at the bead surface. This increases the recovery of proteins from the medium, and lowers the risk of denaturation of the proteins by the medium. Examples of hydrophilic polymers that can be used for this purpose are allyl derivatives of dextran, starch, and methylcellulose. A further advantage of these polymers is that they have a high site density (such as reactive hydroxyl groups) for the attachment of ligands, or a high ligand density if ligands are bonded to these sites before the suspension polymerization that forms the beads. When ligands are attached, the hydrophilic polymers add to the capacity of the medium because of the high ligand density and also because of the flexibility of the attached polymer chains.

Crosslinking agents suitable for use in the present invention include any bifunctional species capable of reacting with the polymerizable compounds described above in a crosslinking manner. For polyacrylamides and polymers of other forms of acrylic acid, examples of suitable crosslinking agents are bisacrylamides, diacrylates, and a wide range of terminal dienes. Specific examples are dihydroxyethylenebisacrylamide, diallyltartardiamide, triallyl citric triamide, ethylene diacrylate, bisacrylylcystamine, N,N'-methylenebisacrylamide and piperazine diacrylamide.

The diameters of the pores (i.e., the channels in the interiors of the beads) that are formed as a result of polymerization and crosslinking are dependent on such parameters as the presence of hydrophobic groups on the monomer structures and their amount and degree of hydrophobicity, as well as the polarity in general of the components in the aqueous solution. In cases where the resulting polymer has a low degree of hydrophobic character, the pore diameter will tend to be smaller than that achieved with polymers of greater hydrophobic character.

Further control of the pore size can be obtained by the inclusion of a polarity modifying agent in the aqueous solution. If the hydrophobic character of the resulting monomer is lower than desired (which would result in a pore size that is smaller than desired), an inorganic salt can serve as an appropriate polarity modifying agent to increase the polarity of the monomer mixture. Examples of salts that are useful for this purpose are sulfate salts, such as ammonium sulfate, lithium sulfate and sodium sulfate. The amount of the salt is not critical and optimal amounts may vary depending on the choice of salt, the monomer, and the crosslinking agent. When ammonium sulfate is used as the salt, for example, a typical amount is within the range of from about 0.4 M (0.8 N) to about 0.8 M (1.6 N), and preferably from about 0.5 M (1.0 N) to about 0.7 M (1.4 N).

An effect similar to that achieved with the an inorganic salt is achieved by the use of hydrophilic polymers. Examples are polyethylene glycol, dextran, methyl cellulose, and polyethylene oxide. The amount of polymer may vary, and the optimum amount in any particular case will depend on the presence and degree of other system parameters. In most cases when a hydrophilic polymer is included for this purpose, the effect will be seen with hydrophilic polymer concentrations in the range of about 5% to about 20% (by weight).

If the hydrophobic character is higher than desired (which would result in a pore size greater than desired), an appropriate polarity modifying agent would be a highly hydrophilic water-soluble additive such as ethylene glycol or glycerol.

When a polarity modifying agent is used, its amount is not critical and the optimal amount may vary with the particular agent used, as well as the particular monomer and crosslinking agent used. Appropriate amounts in each case will be readily apparent to those skilled in the art or capable of determination by routine experimentation. When ethylene glycol is used, for example, a typical amount is within the range of from about 10% to about 40% (by weight) of the aqueous phase.

The organic phase, which serves as the continuous phase in the suspension polymerization, may consist of any organic liquid that is at least partially immiscible with water and will thus form a separate phase, and is chemically inert relative to the monomer mixture in the aqueous phase. Any of a wide variety of organic liquids meeting this description can be used. Such liquids include aliphatic liquids, aromatic liquids, and other chemical classes. Paraffinic and isoparaffinic liquids are particularly useful. High-purity isoparaffinic liquids bearing the name ISOPAR®, obtainable from Exxon Chemical Company, Houston, Tex., USA, are examples.

To stabilize the suspension, a suspending or emulsifying agent can be included in the organic phase. Any nonionic suspending or emulsifying agent that is soluble in the organic phase can be used. Examples are sorbitan derivatives, ethoxylated alkylphenols, and polyethoxylated esters bearing the name ATLOX, obtainable from ICI Surfactants, Wilmington, Del., USA, notably ATLOX 80, ATLOX 775, ATLOX 847, ATLOX 848, ATLOX 849, ATLOX 1045A, ATLOX 4912, and ATLOX 8916. Polymers are often preferably to low-molecular weight compounds as emulsifiers.

Polymerization is conducted according to conventional procedures for suspension polymerization in which the monomers are present in the dispersed aqueous phase. A polymerization initiator or catalyst can be included in the aqueous phase. Examples of polymerization initiators are 2,2'-azobisisobutyronitrile, 4,4'-azobis-(4-cyanopentanoic acid), phenylazotriphenylene methane, t-butyl peroxide, cumyl peroxide, acetyl peroxide, benzoyl peroxide, lauroyl peroxide, t-butyl hydroperoxide, and t-butyl perbenzoate. The organic and aqueous phases are prepared separately, then combined and agitated until the suspension is stabilized. The droplet size can be controlled by the method and degree of agitation and the amount of emulsifying agent. The droplet size is not critical to the invention and can vary. In most applications, a typical droplet will range in size from about 50 microns to about 200 microns. Once the suspension is formed, the temperature is raised and the system is purged with nitrogen until polymerization is complete.

The following examples are offered for purposes of illustration, and are not intended to limit nor to define the invention in any manner.

EXAMPLE 1

Chromatographic beads for use as anion exchange media were prepared as follows.

An aqueous solution was prepared by combining the following components:

| | |
|---|---|
| Water | 10 mL |
| Dimethyl diallyl ammonium chloride | 10 mL |
| (65% weight %, 45% polymerized) | |
| (10.3 g total, 6.7 g monomer, 3.0 g polymerized) | |

-continued

| | |
|---|---|
| Methylene bisacrylamide | 3.0 g |
| Hydroxypropyl methacrylate | 1.6 mL |
| (97 weight %) | (1.7 g) |
| Ammonium sulfate | 1.7 g |
| 4,4'-Azobis(4-cyanopentanoic acid) | 20 mg |
| (added after heating the remaining ingredients to 70° C.) | |

The weight percent of the total of dimethyl diallyl ammonium chloride, methylene bisacrylamide, and hydroxypropyl methacrylate relative to the solution a a whole was 45%, and the mole fraction of crosslinking agent to total monomers was 0.3. This solution was mixed with an organic solution consisting of 150 mL ISOPAR H and 5 g ATLOX 4912. Stirring was continued at 220 rpm for 15 minutes at 70° C., then at 85° C. for 20 minutes. While the temperature was maintained at 85° C., a nitrogen purge was started. Polymerization was observed at 24 minutes. Aggregation began to appear at 25 minutes (at 87° C.), and the maximum temperature reached was 90° C. at 27 minutes. The nitrogen purge was discontinued after 60 minutes and agitation was continued at the same speed at 85° C. for a period of time totaling one hour from the start of the nitrogen purge. The resulting beads were then recovered and examined, to show that the bead diameter was in excess of 150 microns.

The preparation was repeated with aqueous and organic solutions prepared in the same manner, but with stirring at 280 rpm rather than 220 rpm. The polymerization protocol was as follows: agitation at 280 rpm at 85° C. for 20 minutes, 30 seconds, with nitrogen purge, followed by continued agitation at the same speed and temperature for five minutes without nitrogen purge, then agitation at 150 rpm at the same temperature for two hours, again without nitrogen purge. The time to polymerize was 23 minutes, 30 seconds, aggregation began to appear at 24 minutes, 50 seconds, and the maximum temperature reached was 91° C., occurring at 26 minutes, 30 seconds. The resulting beads were recovered and examined, whereupon it was observed that their diameters were in the range of 70 microns to 90 microns. The beads were then homogenized in a blender at 8,000 rpm for five minutes, and some of the beads were then homogenized further for an additional three minutes at 9,000 rpm. The beads that were subjected only to the five-minute homogenization had a smooth outer surface, while the beads that were subjected to the additional three minutes of homogenization had a rough outer surface.

Protein capture studies were performed on the beads to show that the beads have a higher level of protein capture than macroporous beads, since the larger pores of the beads of this invention permit the proteins to diffuse into the beads faster and more easily than into macroporous beads. A column 7 mm in diameter and 55 mm in length was packed with the beads, and bovine serum albumin (BSA), at a concentration of 5 mg/mL in Buffer A, which consisted of 20 mM Tris-HCl at pH 8.2, was applied to the column at a flow rate of 2 mL/min for 50 minutes and a back pressure of 4 psi. The BSA was then replaced with Buffer A alone (not containing BSA) at the same flow rate for ten minutes. Buffer A was then replaced with Buffer B for ten minutes, Buffer B having the same composition as Buffer A except that Buffer B also contained 1.0 M NaCl. The protein content of the column effluent was continuously monitored with a UV monitor.

For the beads that had been homogenized in a blender at 8,000 rpm for five minutes only, the results are shown in FIG. 1, where the three curves represent the following:

Curve I: the buffer flowing through the column, shown in terms of the percent of Buffer B, starting at 0% (i.e., 100% Buffer A) and rising in a single step to 100% at 1 hour Curve II: The conductivity of the column effluent, as a measure of the salt concentration leaving the column, starting at 0% and rising shortly after the Buffer A is replaced by Buffer B Curve III: The protein content of the column effluent as detected by the detector, starting at 0 as the protein is being captured by the beads, then rising gradually as the beads become saturated and protein passes through the bed, dropping back to zero as the protein solution is replaced by Buffer A at 50 minutes, then rising sharply shortly after Buffer A is replaced by Buffer B at 1 hour For the beads that had been homogenized first at 8,000 rpm for five minutes and then at 9,000 rpm for three minutes, the results are shown in FIG. 2, where the three curves represent the same parameters as in FIG. 1.

Figure 2:
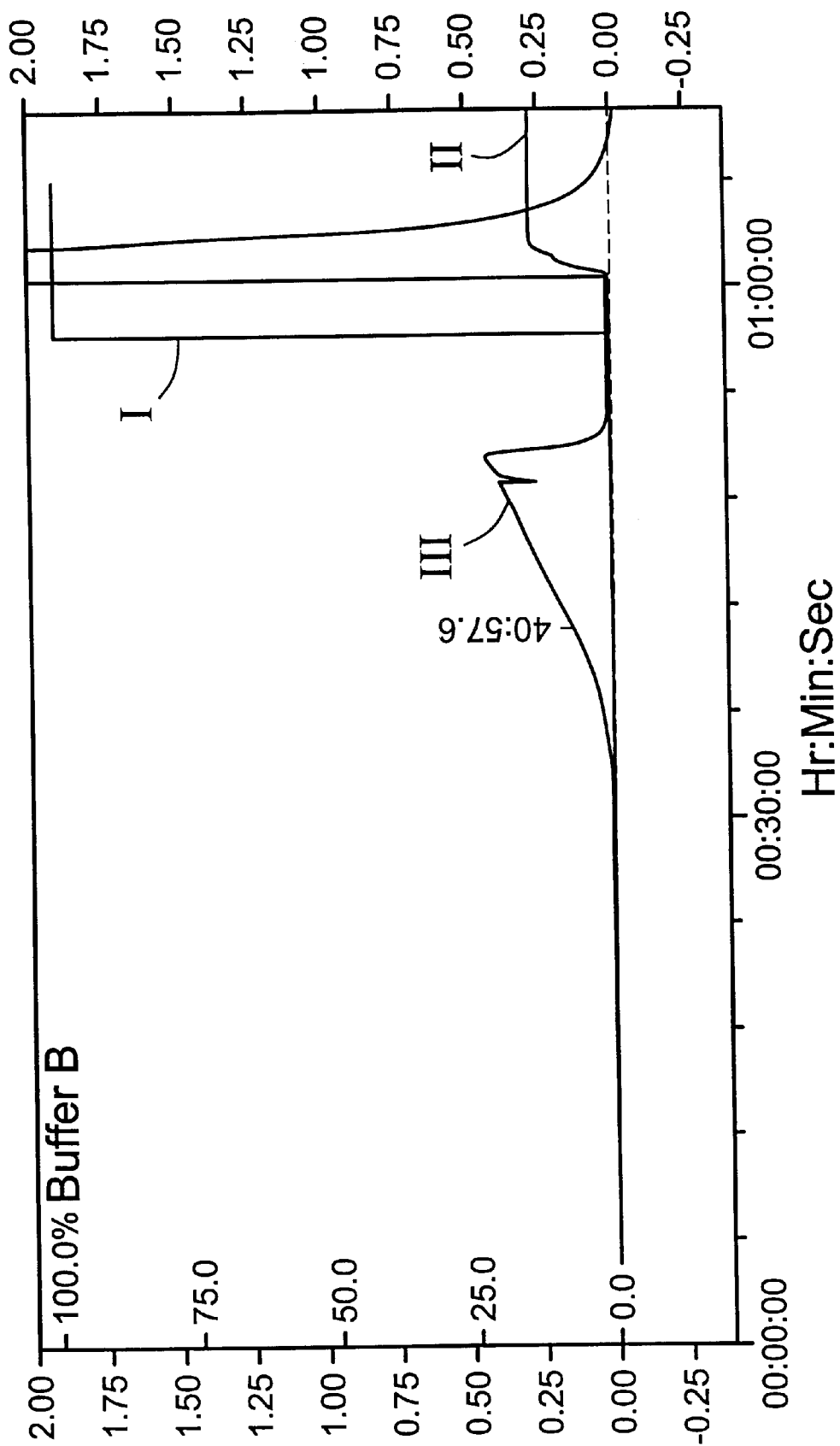
FIG. 2 is a plot of a protein capture study of further anion exchange beads prepared in accordance with this invention.

FIGS. 1 and 2 both indicate that a large volume of protein was captured by the beads, then released by Buffer B.

EXAMPLE 2

Chromatographic beads for use as cation exchange media were prepared as follows.

An aqueous solution was prepared by combining the following components:

| | |
|---|---|
| Water | 13 mL |
| Allyloxy hydroxypropanesulfonic acid, sodium salt, (40 weight %, 28% polymerized) (8.2 g total, 3.3 g monomer, 0.92 g polymerized) | 7.0 mL |
| Methylene bisacrylamide | 3.0 g |
| Hydroxypropyl methacrylate (97 weight %) | 1.5 mL (1.6 g) |
| Vinyl sulfonic acid, sodium salt (57% polymerized) | 1.5 g |
| Monomethyl ether hydroquinone (polymerization inhibitor, to avoid polymerization during dissolving of monomer) | 5 mg |
| 4,4'-Azobis(4 cyanopentanoic acid) (added after heating the remaining ingredients to 75° C.) | 20 mg |

The weight percent of the total of allyloxy hydroxypropanesulfonic acid, methylene bisacrylamide, hydroxypropyl methacrylate, and vinyl sulfonic acid relative to the solution as a whole was 38%, and the mole fraction of crosslinking agent to total monomers was 0.3. This solution was mixed with an organic solution consisting of 150 mL ISOPAR H and 5 g ATLOX 4912 to form a suspension. Stirring was continued at 220 rpm for 15 minutes at 70° C., then at 85° C for 20 minutes. While the temperature was maintained at 85° C., a nitrogen purge was started. Polymerization was observed at 26 minutes, aggregation began to appear at 26 minutes, 40 seconds (at 87° C.), and the maximum temperature reached was 98.5° C. at 28 minutes, 30 seconds. The nitrogen purge was discontinued at 60 minutes, and agitation was continued at the same speed at 85° C. for a period of time totaling 60 minutes from the start of the nitrogen purge. The resulting beads were recovered and examined, to show that the bead diameters were in the range of 50 microns to 70 microns.

Figure 3:
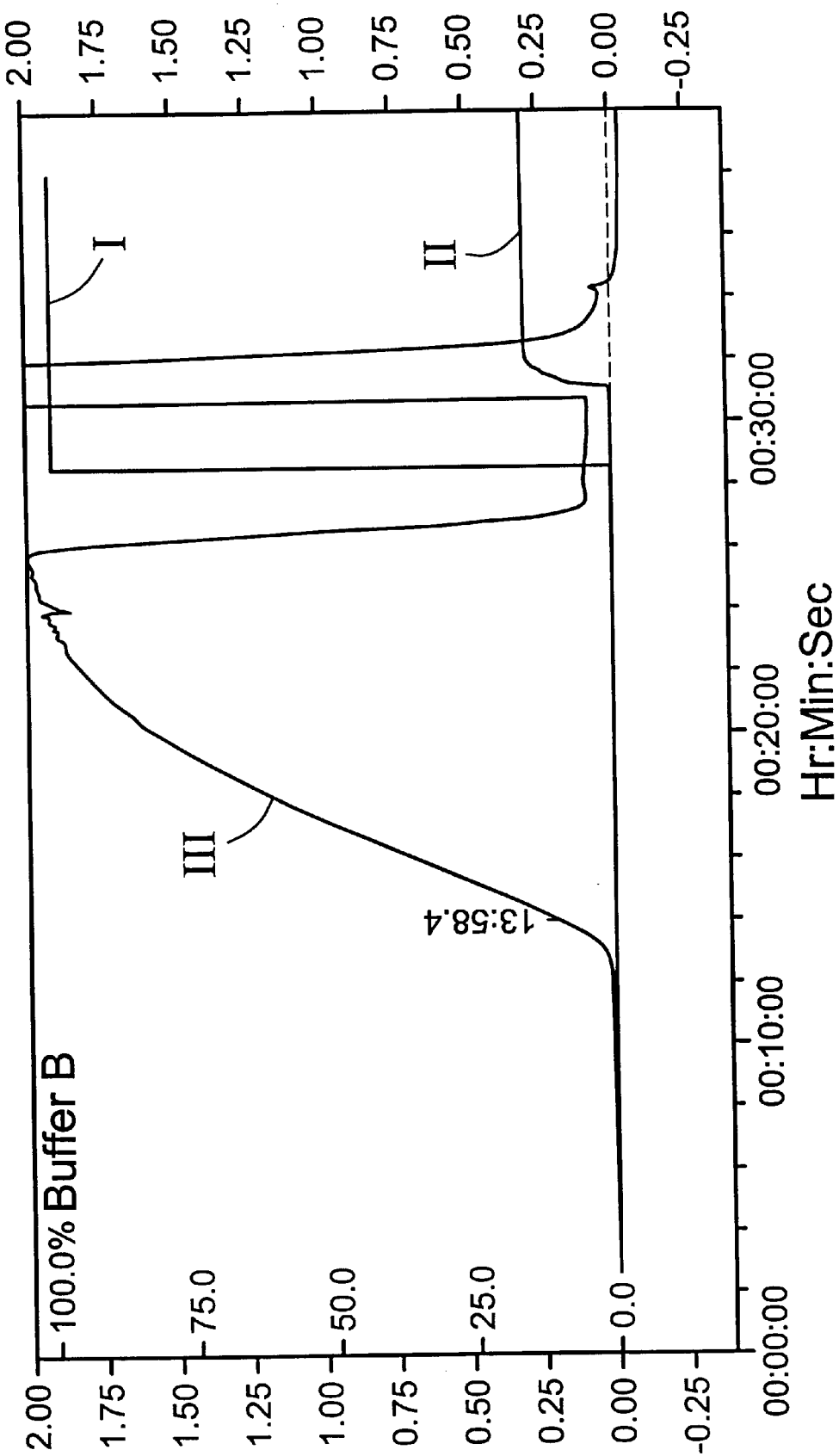
FIG. 3 is a plot of a protein capture study of cation exchange beads prepared in accordance with this invention.

A protein capture study was performed, using conditions similar to those described in Example 1, except that the protein was immunoglobulin G, Buffer A was 20 mM sodium acetate at pH 5.0, Buffer B was Buffer A plus 1.0 M NaCl at pH 8.3, and the flow of the immunoglobulin G solution was continued for only 20 minutes followed by ten minutes each of Buffers A and B. A plot of the results appears in FIG. 3, in which Curves I, II, and III represent the same parameters as in Example 1. As in FIGS. 1 and 2, the results show that a large volume of protein was captured by the beads within 14 minutes, then released essentially all at once by Buffer B.

EXAMPLE 3

Chromatographic beads for use as hydrophobic interaction media were prepared as follows.

An aqueous solution was prepared by combining the following components:

| | |
|---|---|
| Water | 1.3 mL |
| n-Propyl acrylamide | 300 μL (0.3 g) |
| Methylene bisacrylamide | 0.3 g |
| Ethylene glycol | 0.7 mL (0.8 g) |

This solution was mixed with an organic solution consisting of 15 mL ISOPAR H and 0.15 g ATLOX 4912. Stirring was continued at 200 rpm for 15 minutes at 70° C., then at 85° C. for 20 minutes. While the temperature was maintained at 85° C., a nitrogen purge was started. Polymerization was observed at 26 minutes; and the maximum temperature reached was 90° C. at 28 minutes. The nitrogen purge was discontinued at 60 minutes, and agitation was continued at the same speed at 85° C. for a period of time totaling 60 minutes from the start of the nitrogen purge. The resulting beads were recovered and examined, to show that the bead diameter was in the range of 80 microns to 90 microns.

Figure 4:
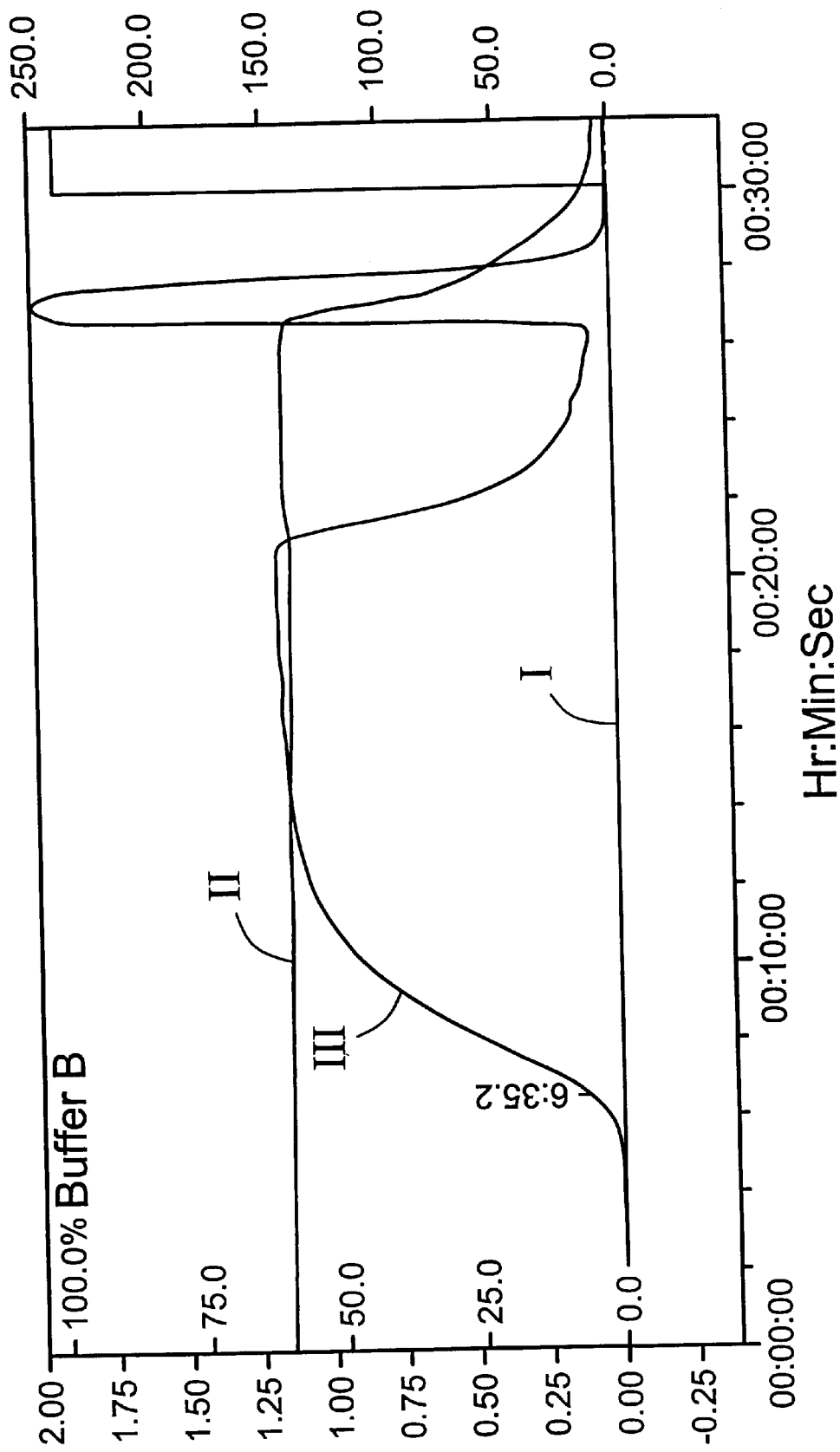
FIG. 4 is a plot of a protein capture study of hydrophobic interaction beads prepared in accordance with this invention.
Figure 5:
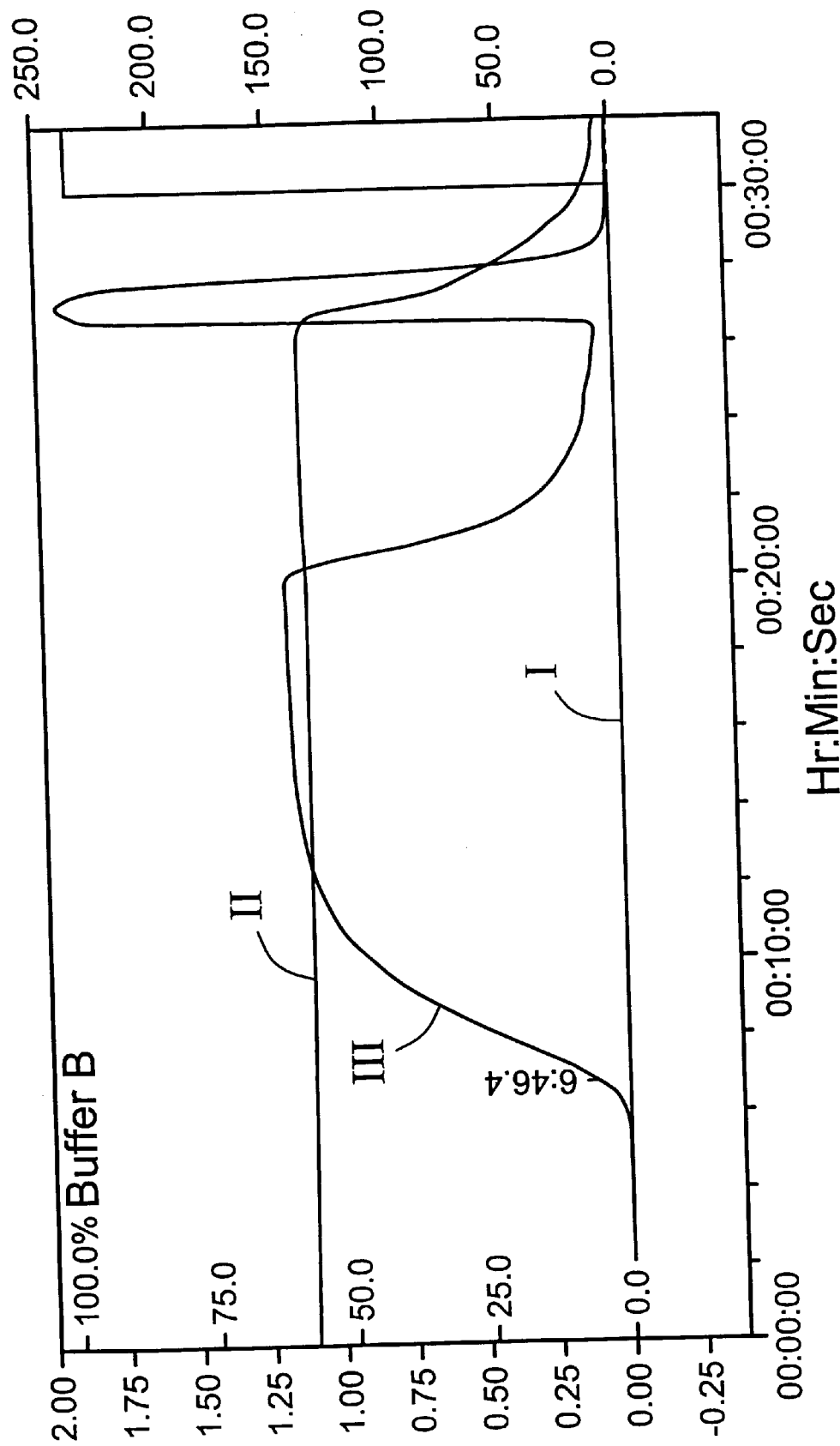
FIG. 5 is a plot of a second protein capture study of hydrophobic interaction beads prepared in accordance with this invention.

Protein capture studies are shown in FIGS. 4 and 5, using protocols similar to those of Examples 1 and 2. In each of these studies, the protein was BSA introduced into the column as a 4 mg/mL solution in Buffer A which in this case consisted of 20 mM sodium phosphate at pH 7.0 with 2 M ammonium sulfate. The flow rate through the column was 2 mL/min. Flow of the protein solution was continued for twenty minutes, at which time the protein solution was replaced with Buffer A alone (without BSA). Flow of Buffer A was continued for ten minutes, then replaced with Buffer B, which consisted of 20 mM sodium phosphate at pH 7.0 for a final ten minutes.

The results of one study performed according to this protocol are shown in the plot of FIG. 4, in which Curve I represents the percent of the Buffer B (containing no ammonium sulfate), Curve II represents the conductivity in the effluent (an indication of the ammonium sulfate concentration), and Curve III represents the protein content of the column effluent. A repeat of the FIG. 4 study was performed, after having first exposed the beads to NaOH to assess the stability of the hydrophobic ligand in the n-propyl acrylamide monomer, by passing 1 M NaOH through the column for 24 hours. The results of this repeat study are shown in FIG. 5, and the similarity between FIGS. 4 and 5 indicate that the covalent bond between the ligand and the polymeric structure of the beads is stable.

Figure 6:
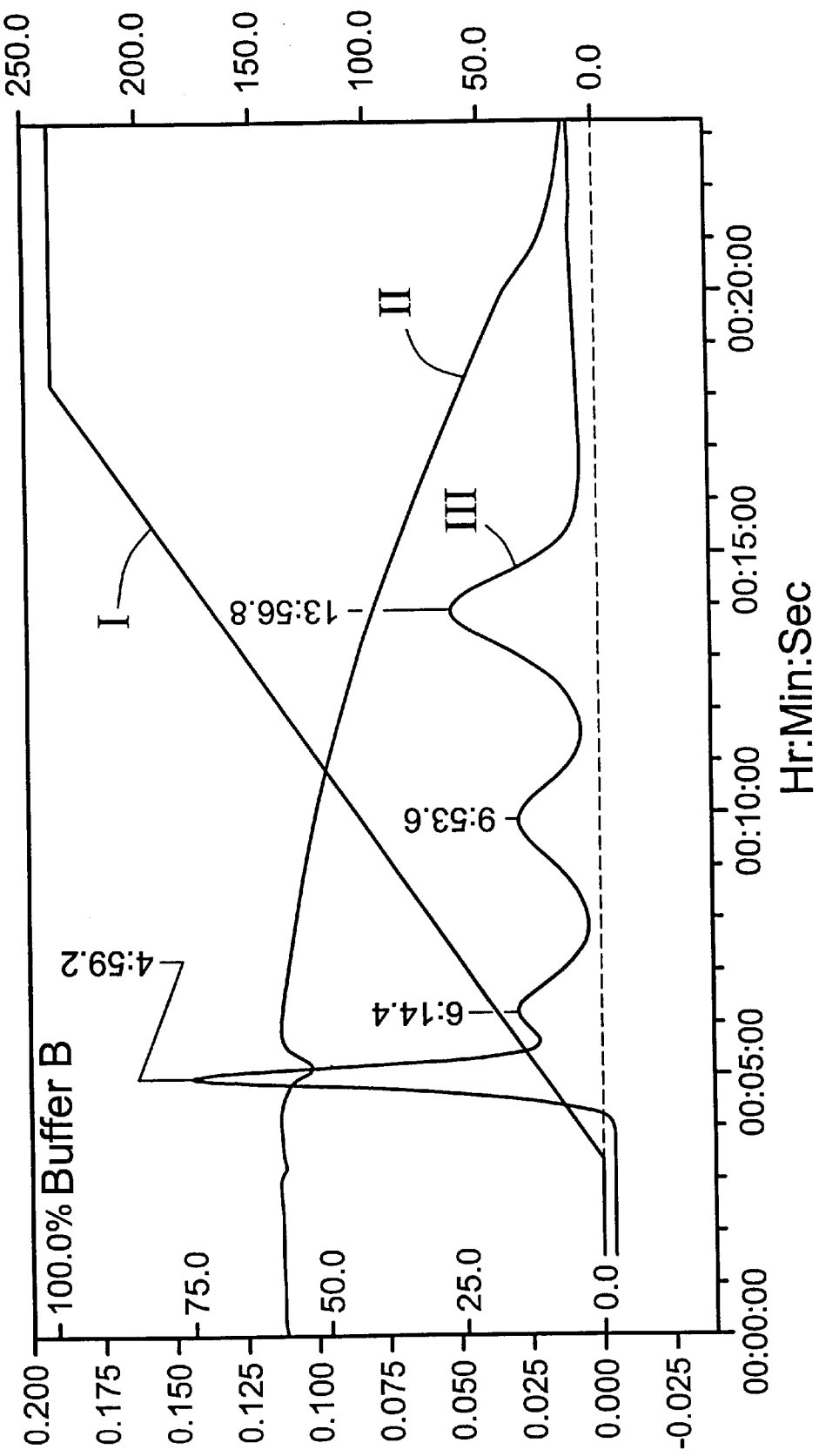
FIG. 6 is a chromatogram of a protein mixture separated by hydrophobic interaction using the beads of FIG. 4.
Figure 7:
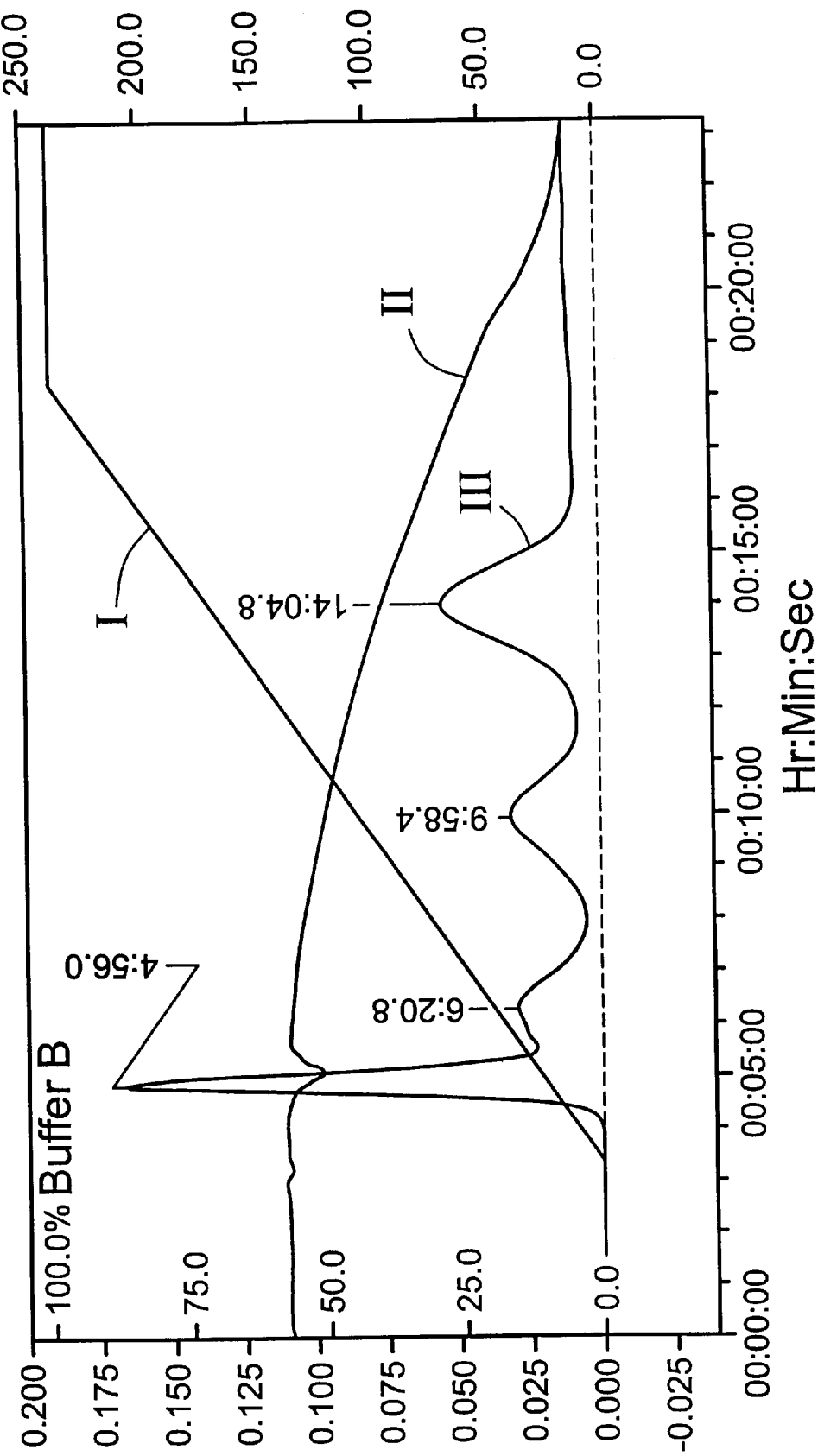
FIG. 7 is a chromatogram of a protein mixture separated by hydrophobic interaction using the beads of FIG. 5.

The beads were then used to perform a chromatographic separation of a protein mixture consisting of cytochrome c, equine myoglobin, and lysozyme, using a gradient elution in which Buffer A was gradually replaced by Buffer B in a linear gradient over a period of time extending from 3.5 minutes after the start of the run to 18 minutes. The column was the same as that used in Examples 1 and 2, and the flow rate through the column was 1 mL/min. The resulting chromatogram is shown in FIG. 6, in which Curve I represents the percent of Buffer B in the buffer mixture, Curve II represents the conductivity of the column effluent (an indication of the concentration of ammonium sulfate emerging from the column), and Curve III is the chromatogram (indicating the protein concentrations passing the UV detector). A clear separation of the protein mixture into four peaks with full resolution is shown: the two leftmost peaks represent cytochrome c, the next peak equine myoglobin, and the rightmost peak lysozyme. This study was repeated after passing 1 M NaOH through the column for 24 hours to test the stability of the ligand bond. The results of the repeat study are shown in FIG. 7, and the similarity between FIGS. 6 and 7 indicate that covalent bond between the ligand and the polymeric structure of the beads is stable.

The foregoing is offered primarily for purposes of illustration. Further modifications and variations of the system, compositions, materials, and procedures may be made that are still within the scope of the invention.

What is claimed is:

1. A process for the preparation of a chromatographic separation medium in the form of beads having through-pores with diameters of at least about 0.5 micron, said process comprising:

(a) forming a suspension of aqueous liquid droplets in an organic continuous phase, said aqueous liquid comprising a monomer mixture dissolved in water, said monomer mixture consisting of water-soluble polymerizable compound and water-soluble crosslinking agent, in which the weight percent of said monomer mixture relative to said aqueous liquid is from about 2% to about 50% and the mole fraction of said crosslinking agent relative to said monomer mixture is from about 0.1 to about 0.7, and said organic continuous phase comprising an organic solvent with an emulsifying agent dissolved therein, said organic solvent being at least partially immiscible with water;

(b) polymerizing said droplets to form solid porous beads having through-pores with diameters of from at least about 0.5 micron; and (c) recovering said solid porous beads from said organic continuous phase.

2. A process in accordance with claim 1 in which the mole fraction of said crosslinking agent relative to said monomer mixture is from about 0.3 to about 0.4.

3. A process in accordance with claim 1 in which the weight percent of said monomer mixture relative to said aqueous liquid from about 20% to about 40%.

4. A process in accordance with claim 1 in which the weight percent of said monomer mixture relative to said aqueous liquid is from about 20% to about 40% and the mole fraction of said crosslinking agent relative to said monomer mixture is from about 0.3 to about 0.4.

5. A process in accordance with claim 1 in which said polymerizable compound is a member selected from the group consisting of vinyl, allyl, acrylic and methacrylic compounds.

6. A process in accordance with claim 1 in which said polymerizable compound is a member selected from the group consisting of vinyl acetate, vinyl propylamine, acrylic acid, acrylamide, methacrylamide, substituted derivatives of these compounds bearing reactive hydroxy groups, substituted derivatives of these compounds bearing reactive epoxy groups, substituted derivatives of these compounds bearing reactive carboxy groups, and substituted derivatives of these compounds bearing reactive amino groups.

7. A process in accordance with claim 1 in which said crosslinking agent is a member selected from the group consisting of N,N'-methylene-bis-acrylamide and piperazine diacrylamide.

8. A process in accordance with claim 1 in which said beads have diameters of from about 50 microns to about 200 microns.

9. A process in accordance with claim 1 in which said chromatographic separation medium is an ion-exchange medium, and said polymerizable compound is a mixture of (i) a member selected from the group consisting of vinyl, allyl, acrylic, and methacrylic compounds and (ii) a member selected from the group consisting of vinyl, allyl, acrylic and methacrylic compounds to which charged groups are covalently attached.

10. A process in accordance with claim 9 in which said separation medium is an anion-exchange medium, (ii) is a member selected from the group consisting of vinyl, allyl, acrylic, and methacrylic compounds to which positively charged groups are covalently attached, and said monomer mixture further comprises an inorganic salt that increases the polarity of said monomer mixture.

11. A process in accordance with claim 10 in which said inorganic salt is ammonium sulfate.

12. A process in accordance with claim 11 in which the concentration of said ammonium sulfate is from about 0.4 to about 0.8 moles per liter.

13. A process in accordance with claim 10 in which said positively charged groups are quaternary ammonium groups.

14. A process in accordance with claim 9 in which said chromatographic separation medium is a cation-exchange medium, and (ii) is a member selected from the group consisting of vinyl, allyl, acrylic, and methacrylic compounds to which negatively charged groups are covalently attached.

15. A process in accordance with claim 14 in which said negatively charged groups are a member selected from the group consisting of sulfonic acid, sulfate, and carboxylic acid groups.

16. A process in accordance with claim 1 in which said chromatographic separation medium is a hydrophobic interaction medium, and said polymerizable compound is a monomer containing hydrophobic alkyl groups.

17. A process in accordance with claim 16 in which said polymerizable compound is a member selected from the group consisting of vinyl, allyl, acrylic and methacrylic compounds substituted with hydrophobic alkyl groups, and said aqueous liquid further comprises a member selected from the group consisting of ethylene glycol and glycerol in a hydrophobicity-reducing amount.

18. A process in accordance with claim 16 in which said polymerizable compound is n-propyl acrylamide, and said aqueous liquid further comprises a member selected from the group consisting of ethylene glycol and glycerol in a hydrophobicity-reducing amount.

19. A chromatographic hydrophobic interaction separation medium consisting of solid insoluble beads prepared by a suspension polymerization process comprising:

(a) suspending aqueous liquid droplets in an organic continuous phase, said aqueous liquid comprising a monomer mixture dissolved in water, said monomer mixture consisting of water-soluble polymerizable compound and water-soluble crosslinking agent, in which said water-soluble polymerizable compound is a monomer containing hydrophobic alkyl groups, and in which the weight percent of said monomer mixture relative to said aqueous liquid is from about 2% to about 50% and the mole fraction of said crosslinking agent relative to said monomer mixture is from about 0.1 to about 0.7, and said organic continuous phase comprising an organic solvent with an emulsifying agent dissolved therein, said organic solvent being at least partially immiscible with water;

(b) polymerizing said droplets to form solid porous beads having through-pores with diameters of at least about 0.5 micron; and (c) recovering said solid porous beads from said organic continuous phase.

20. A chromatographic separation medium in accordance with claim 19 in which said polymerizable compound is n-propylacrylamide, and said aqueous liquid further comprises a member selected from the group consisting of ethylene glycol and glycerol in a hydrophobicity-reducing amount.

21. A chromatographic ion-exchange separation medium consisting of solid insoluble beads prepared by a suspension polymerization process comprising:

(a) suspending aqueous liquid droplets in an organic continuous phase, said aqueous liquid comprising a monomer mixture dissolved in water, said monomer mixture consisting of water-soluble polymerizable compound and water-soluble crosslinking agent, in which said water-soluble polymerizable compound is a mixture of (i) a member selected from the group consisting of vinyl, allyl, acrylic, and methacrylic compounds and (ii) a member selected from the group consisting of vinyl, allyl, acrylic, and methacrylic compounds to which charged groups are covalently attached, and in which the weight percent of said monomer mixture relative to said aqueous liquid is from about 2% to about 50% and the mole fraction of said crosslinking agent relative to said monomer mixture is from about 0.1 to about 0.7, and said organic continuous phase comprising an organic solvent with an emulsifying agent dissolved therein, said organic solvent being at least partially immiscible with water;

(b) polymerizing said droplets to form solid porous beads having through-pores with diameters of at least about 0.5 micron; and (c) recovering said solid porous beads from said organic continuous phase.

22. A chromatographic separation medium in accordance with claims 21 or 19 in which the mole fraction of said crosslinking agent relative to said monomer mixture is from about 0.3 to about 0.4.

23. A chromatographic separation medium in accordance with claims 21 or 19 in which the weight percent of said monomer mixture relative to said aqueous liquid is from about 20% to about 40%.

24. A chromatographic separation medium in accordance with claims 21 or 19 in which the weight percent of said monomer mixture relative to said aqueous liquid is from about 20% to about 40% and the mole fraction of said crosslinking agent relative to said monomer mixture is from about 0.3 to about 0.4.

25. A chromatographic separation medium in accordance with claims 21 or 19 in which said beads have diameters of from about 50 microns to about 200 microns.

26. A chromatographic separation medium in accordance with claim 21 in which said separation medium is an anion-exchange medium, (ii) is a member selected from the group consisting of vinyl, allyl, acrylic, and methacrylic compounds to which positively charged groups are covalently attached; and said monomer mixture further comprises an inorganic salt that increases the polarity of said monomer mixture.

27. A chromatographic separation medium in accordance with claim 21 in which said chromatographic separation medium is a cation-exchange medium, and (ii) is a member selected from the group consisting of vinyl, allyl, acrylic, and methacrylic compounds to which negatively charged groups are covalently attached.

* * * * *